United States Patent [19]
Fowler et al.

[11] Patent Number: 5,310,135
[45] Date of Patent: May 10, 1994

[54] HELICOPTER INTEGRATED FIRE AND FLIGHT CONTROL HAVING COORDINATED AREA BOMBING CONTROL

[75] Inventors: Donald W. Fowler, Oxford; Nicholas D. Lappos, Milford, both of Conn.

[73] Assignee: United Technologies Corporation, Hartford, Conn.

[21] Appl. No.: 967,308

[22] Filed: Oct. 28, 1992

[51] Int. Cl.$^5$ .................................................. B64C 11/34
[52] U.S. Cl. ............................. 244/17.13; 244/75 R; 89/41.21; 364/423
[58] Field of Search ............... 244/17.13, 75 R, 76 R, 244/221, 190, 137.4; 89/41.21; 364/423, 424.01, 434

[56] References Cited

U.S. PATENT DOCUMENTS

| | | | |
|---|---|---|---|
| 2,933,980 | 4/1960 | Moore et al. | 244/190 X |
| 4,067,517 | 1/1978 | Barnum | 244/17.13 |
| 4,528,891 | 7/1985 | Branello et al. | 89/41.21 |
| 5,222,691 | 6/1993 | Gold et al. | 244/17.13 |

OTHER PUBLICATIONS

McDonnell Douglas Helicopter Company, Integrated Air-to-Air Weapon (INTAAW) Evaluation System Definition Report, Final Issue, Jan. 23, 1990, pp. 6-1 to 6-31.

"A Simulator Investigation of Parameters Affecting Helicopter Handling Qualities in Air Combat (HAC II)", pp. 1-18, by Michael S. Lewis and M. Hossein Mansur, Aerospace Engineers, Ames Research Center; and Robert T. M. Chen, NASA Ames Research Center.

IFEE AES Systems Magazine, Jan. 1992, "Integrated Flight/Fire Control for Attach Helicopters", pp. 17-23, by Stephen Osder of McDonnell Douglas Helicopter Company.

Chief Engineer, vol. 6, No. 4, Jul.-Aug. 1983, "Design and Analysis of a Digitally Controlled Integrated Flight/Fire Control System", pp. 251-257, by John H. Blakelock, Applications Research Corporation.

Primary Examiner—Margaret A. Focarino
Assistant Examiner—Christopher P. Ellis
Attorney, Agent, or Firm—Michael Grillo

[57] ABSTRACT

During operation of a flight control system in a coordinated area bombing mode, one pair in a group of pairs of fire control azimuth coordinate error signal and elevation coordinate error signals are faded-in as the aircraft yaw attitude reference and pitch attitude reference, respectively. Each pair is respectively indicative of the change in aircraft yaw attitude and pitch attitude for an aircraft reference axis to be aligned with an aiming line of sight. The aiming line of sight corresponds to a target location within a selected target area. A firing signal is provided in response to both the azimuth and elevation coordinate error signals being below respective threshold magnitudes, and the next pair in the group of pairs of azimuth and elevation coordinate error signals provide the aircraft attitude reference. A selected weapon is fired in response to the firing signal.

15 Claims, 8 Drawing Sheets

HELICOPTER INTEGRATED FIRE AND FLIGHT CONTROL HAVING COORDINATED AREA BOMBING CONTROL

The Government has rights in the invention pursuant to a contract awarded by the Department of the Army.

TECHNICAL FIELD

The present invention relates to flight control systems for rotary wing aircraft and more particularly to an integrated fire and flight control system which provides aircraft azimuth and pitch control, and weapons fire control for coordinating ordinance delivery at target locations within a defined target area.

BACKGROUND OF THE INVENTION

The combat uses for helicopter aircraft have changed dramatically over the years to include contact with opposing forces, including reconnaissance and combat aircraft assistance of troops on the front line. This type of use subjects helicopters to numerous threats, and therefore new helicopter designs incorporate offensive weapons, such as Gatling guns and rocket launchers.

Initially, the primary control of helicopter weapons was accomplished by the pilot adjusting the aircraft attitude prior to firing. Correction for misses was accomplished by the pilot adjusting the attitude of the aircraft prior to expending additional ordnance. As technology developed, tracking and sensing systems were used to locate a target or target area and determine the aircraft attitude necessary to aim the weapon so as to account for outside forces acting on the ordnance, e.g., wind, aircraft speed, etc. Such a system typically displays a "cross-hair" indicative of actual aircraft attitude and a geometric shape indicative of the required aircraft attitude to provide a high probability of striking the target with the weapon. The pilot is required to maneuver the aircraft so as to place the cross-hair in the firing solution defined by the shape prior to firing the weapon. The aiming instructions, e.g., cross-hair and geometric shape, are typically displayed on a control panel, a heads-up display, or helmet-mounted display which provides the pilot with visual information relating to the target position, ownship attitude, heading, speed and altitude.

Although such aiming systems improved weapons delivery accuracy, the pilot is still under a significant burden to regulate aircraft heading and pitch attitude. It is well-known that a skilled helicopter pilot can control aircraft attitude within about 1 degree of pitch and yaw. Although this may seem very accurate control, a 1 degree variation in pitch or yaw will have a significant effect on the trajectory of a projectile.

DISCLOSURE OF THE INVENTION

Objects of the invention include provision of an improved flight control system for a rotary wing aircraft, which is integrated with an aircraft fire control system for simultaneously controlling aircraft yaw attitude, pitch attitude and the firing of aircraft mounted weapons to thereby coordinate the accurate delivery of ordinance at specific target coordinates within a selected target area.

A further object of the present invention is to provide an integrated fire and flight control system which uses a fire control solution to control aircraft yaw attitude and pitch attitude, and which maintains pilot command authority to override the fire control solution effects on aircraft yaw attitude and pitch attitude.

According to the present invention, one pair in a group of pairs of fire control azimuth coordinate error signals and elevation coordinate error signals are faded-in as the aircraft attitude reference, replacing the flight control system yaw attitude feedback error signal and pitch attitude feedback error signal, respectively. In further accord with the present invention, a firing signal is provided in response to both the azimuth and elevation coordinate error signals being below respective threshold magnitudes, and the next pair in the group of pairs then provide the aircraft attitude reference.

In still further accord with the present invention, the fire control system is integrated with the flight control system only while the pilot manually depresses and holds an enable switch, and during integration of the fire control system and the flight control system, the pilot stick control path remains the primary input to the flight control system to thereby provide override capability for pilot commanded yaw and pitch maneuvers.

The present invention reduces pilot workload during weapons aiming and improves overall weapons effectiveness since the fire control system is used to automatically provide a commanded pitch and yaw attitude reference and a firing signal for coordinated weapons aiming and firing. When fire control system azimuth and elevation coordinate error signals are providing the yaw and pitch attitude reference, the aircraft must assume the proper firing attitude prior to the automatic firing of selected weapons. After the firing of a weapon, the aircraft assumes the firing attitude corresponding to the next target location within a target area prior to the firing of additional weapons. The pilot commanded stick input maintains primary authority, and therefore the pilot is capable of fully exercising the aircraft's inherent agility for evasive maneuvers, to break lock from enemy targeting systems or to engage new threats.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

The integrated fire and flight control (IFFC) system of the present invention is particularly well suited for aiding a helicopter pilot in the coordinated area bombing of a selected target area, and for improving the overall weapons effectiveness by increasing ordnance delivery accuracy. As used herein, the phrase "coordinated area bombing" refers to the delivery of ordinance at specific target coordinates (target locations) within a selected target area. The type of ordinance used and the targets to be destroyed determine the number and spread of coordinates within the target area. The firing or release of the weapons is coordinated with the changing attitude of the aircraft such that the ordinance are accurately delivered at the desired target coordinates within the selected target area.

Figure 1:
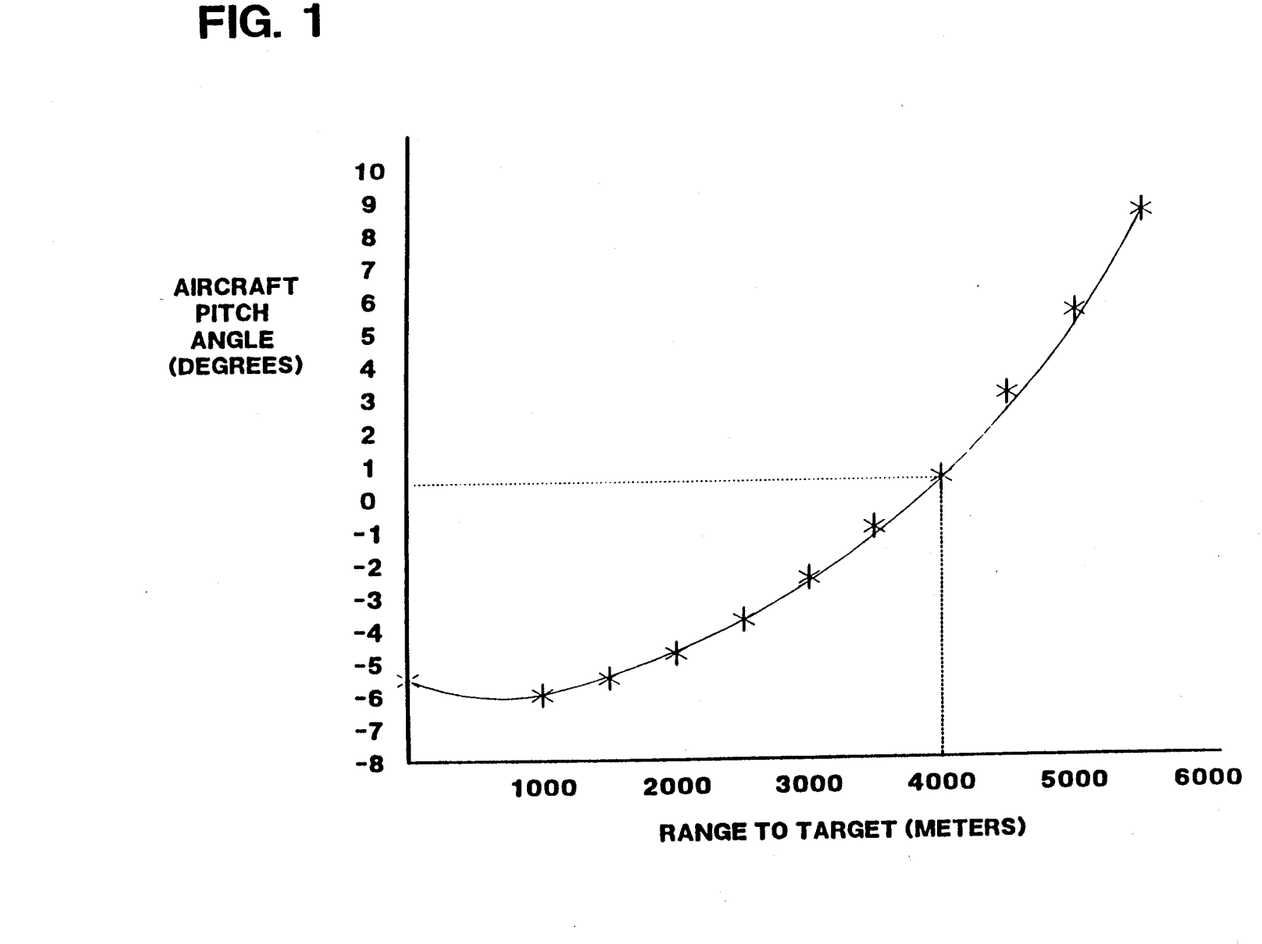
FIG. 1 is a graph showing the relationship between aircraft pitch angle and ordnance range for a Mark 40 2.75 inch folding fin aerial rocket having a ten-pound warhead.

Referring to FIG. 1, a launch table shows the relationship between aircraft pitch angle and ordnance delivery range for a Mark 40, 2.75 inch, folding fin aerial rocket having a ten-pound warhead. For example, the pilot is required is achieve a $\frac{1}{8}$° pitch angle to deliver the ordnance at a range of 4,000 meters. This graph assumes that the aircraft and the target are at the same altitude. Further adjustments are required if the target is at a different altitude from the aircraft, i.e., if the target is a ground location in a target area.

Figure 2:
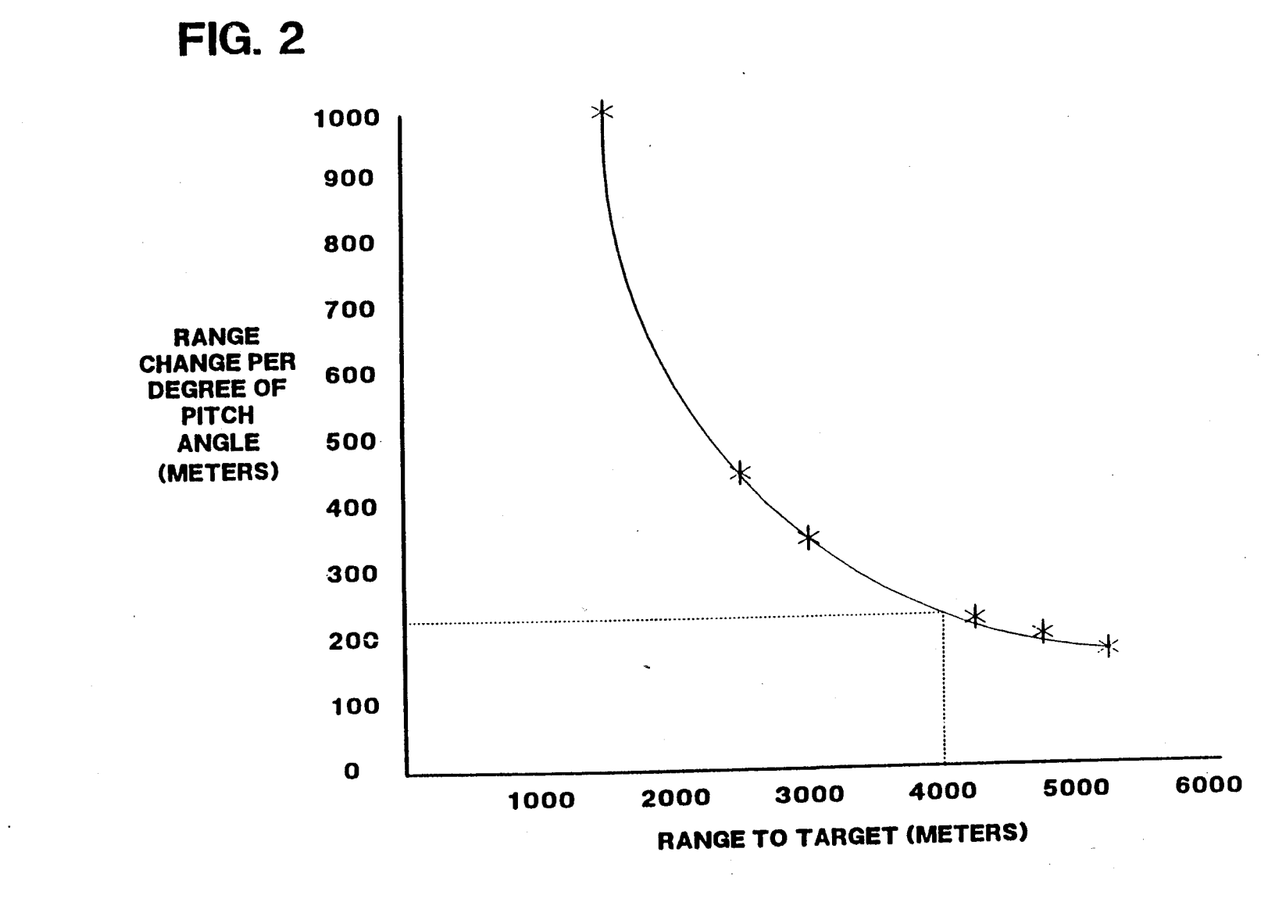
FIG. 2 is a graph showing the relationship between the change in ordnance delivery range per degree of pitch angle and the range to the target for the Mark 40 rocket of FIG. 1.
Figure 3:
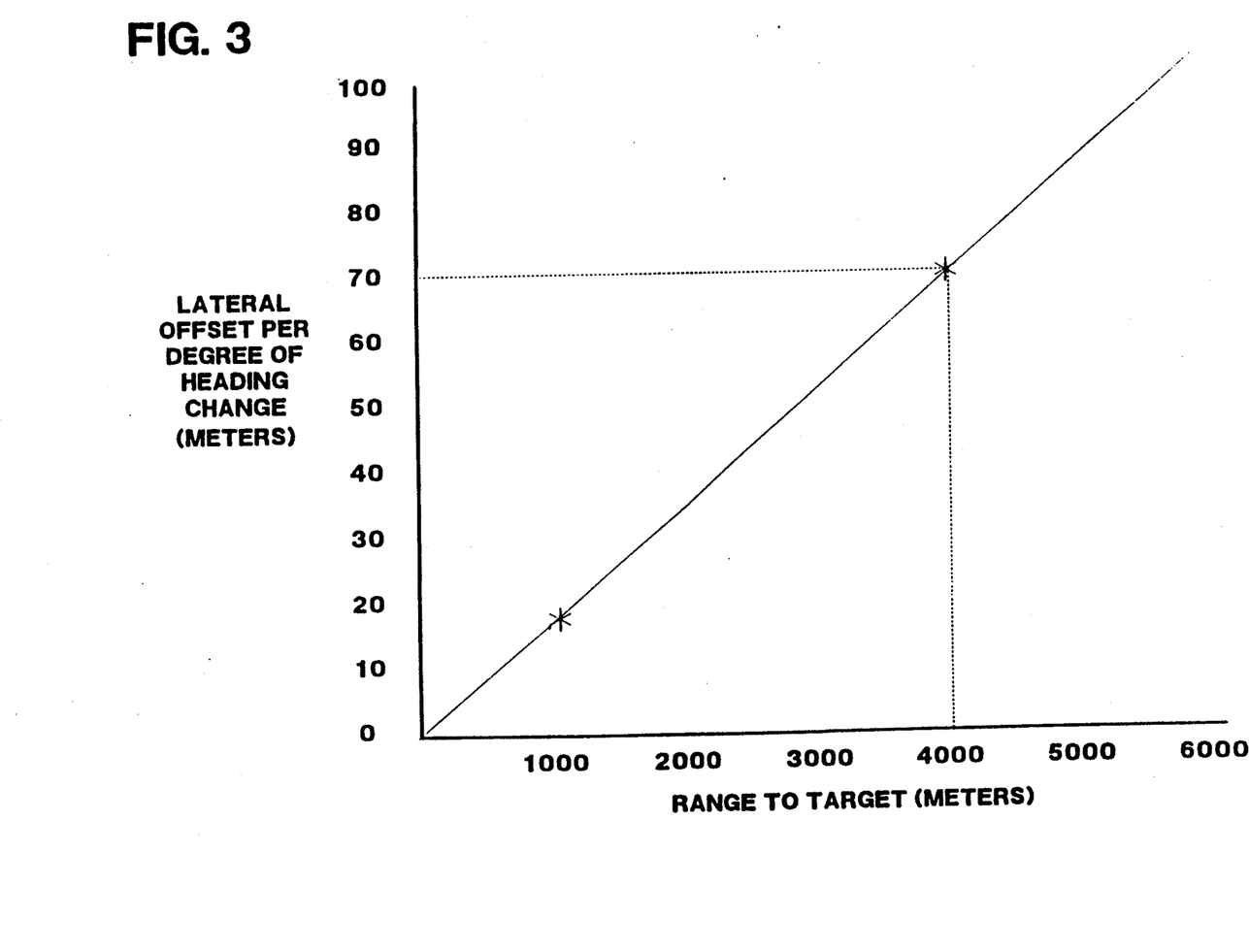
FIG 3 is a graph showing the relationship between the lateral offset per degree of heading change and the range to the target for the Mark 40 rocket of FIG. 1.

It is well-known that a skilled pilot is able to control pitch and yaw attitude within about $\pm 1$°. FIG. 2 illustrates the variations in impact point caused by a 1° change in pitch angle depending on the range to the target. For example, at a 4,000 meter range, a 1° pitch angle change will move the impact point by approximately 250 meters. FIG. 3 illustrates the variation in impact point per degree of heading change for targets at various ranges. For example, at a 4,000 meter range, a 1° heading change will offset the impact point by approximately 70 meters. It will therefore be understood that to achieve a high probability of impact, the pilot is required to expend numerous ordnance to increase the probability of a successful impact.

The integrated fire and flight control system of the present invention improves the accuracy of aiming pitch and yaw attitude to within about $\pm 0.1$° of the fire control system firing solution. The system greatly enhances the accuracy of weapons delivery, while reducing the pilot workload during weapons delivery.

Figure 4:
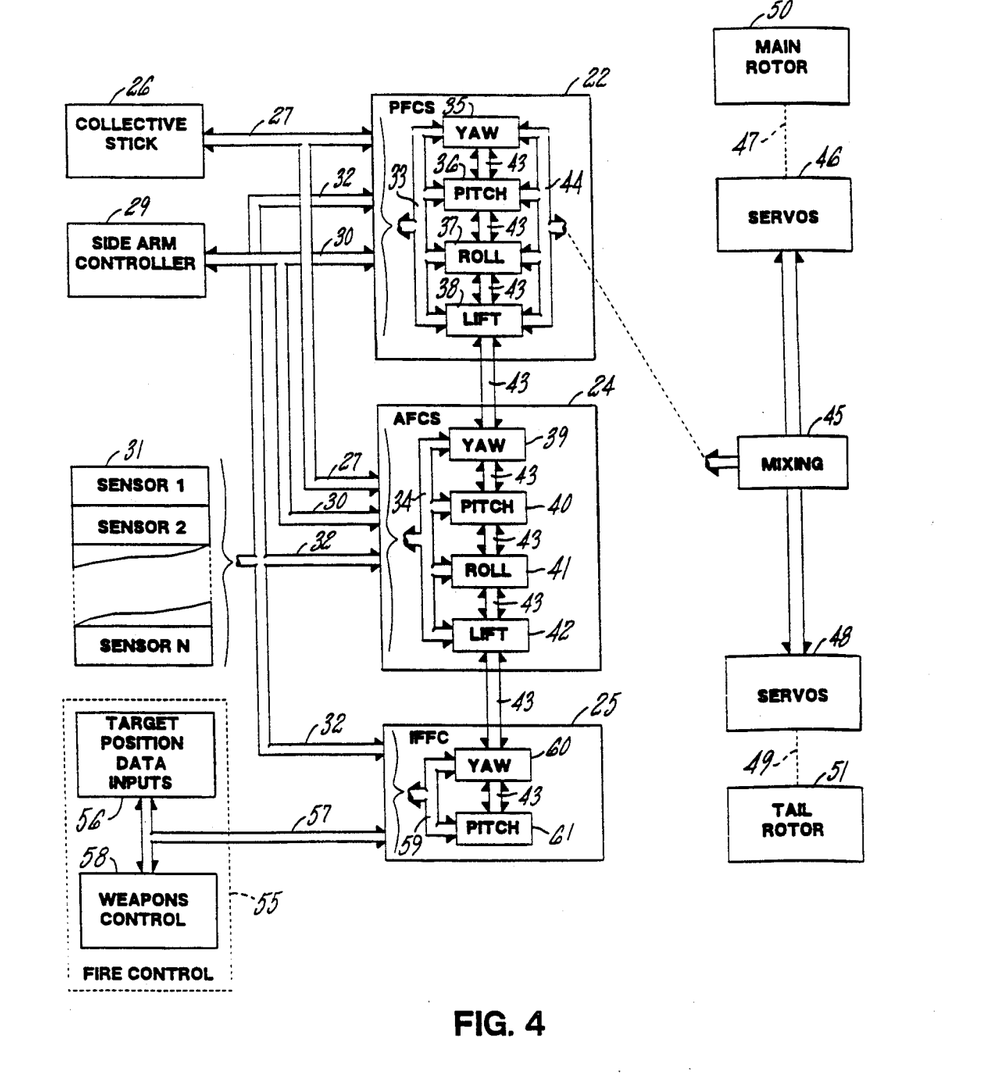
FIG. 4 is a block diagram of an integrated fire and flight control system of the present invention.

Referring now to FIG. 4, the system of the presight invention 21 includes a primary flight control system (PFCS) 22, an automatic flight control system (AFCS) 24 and an integrated fire and flight control system (IFFC) 25. The PFCS receives displacement command output signals from a displacement collective stick 26 on lines 27. The AFCS also receives collective stick discrete output signals on the lines 27. The PFCS and AFCS each receive the force output command signals of a four-axis sidearm controller 29 on lines 30. The AFCS and PFCS also receive sensed parameter signals from sensors 31 on lines 32. The pilot command signals on lines 27 and 30 and the sensed parameter signals on lines 32 are shown consolidated within trunk lines 33 and 34 in the PFCS and AFCS, respectively.

The PFCS and AFCS each contain control modules for controlling the yaw, pitch, roll and lift axes of the aircraft. These modules are shown by blocks 35-38 for the PFCS and blocks 39-42 for the AFCS. The PFCS modules provide rotor command signals, and the AFCS modules provide conditioning and/or trimming of the PFCS rotor command signals. The PFCS and AFCS modules are interconnected through bus 43.

The PFCS and AFCS use a model following algorithm in each control axis to provide rotor command signals on output lines 44 to a rotor mixing function 45 which commands displacement of mechanical servos 46 and linkages 47 to control the tip path plane of a main rotor 50. Additionally, the rotor mixing function 45 controls tail rotor servos 48 which control the thrust of a tail rotor 51 through linkages 49. The sensed parameter signals from sensors 31, on lines 32, provide the PFCS and AFCS with the aircraft's angular rate and attitude response to the main rotor and tail rotor command signals. Additionally, the sensors provide information related to velocity, altitude, acceleration, etc., which information may or may not be used by the flight control system.

The IFFC 25 receives fire control data from a fire control system 55 on lines 57. The IFFC also receives sensed parameter signals on lines 32 from sensors 31. Target position data is provided from target position/angle data inputs 56. The target position/angle data may be provided from a variety of sources as is well-known in the art, e.g., line of sight angle sensors, map and position data, infrared sensors, laser sensors, radar sensors, etc. Weapons control data is also provided on lines 57 from a weapons control portion 58 of the fire control system 55. The fire control data and weapons control data on lines 57 and sensed parameter signals on lines 32 are shown consolidated within trunk lines 59 in the IFFC.

The IFFC contains control channel modules for providing yaw and pitch control signals to the AFCS. These modules are shown by blocks 60 and 61, respectively. The IFFC modules are interconnected to the PFCS and AFCS modules through the bus 43. As described in greater detail hereinafter, during coordinated area bombing the AFCS yaw and pitch axis attitude feedback error signals are replaced with fire control azimuth and elevation coordinate error signals, respectively. Normally, in response to pilot commands, the AFCS provides the desired yaw and pitch attitude reference. The difference between these attitude reference commands and actual aircraft attitude are attitude feedback error signals which the AFCS continuously attempts to reduce to zero. When certain weapons are selected, e.g., a rocket having a fixed pod, and IFFC is enabled, then fire control azimuth and elevation coordinate error signals are used as the respective attitude feedback error signals. This is referred to as the "coordinated area bombing" mode of operation. IFFC may be enabled by the pilot depressing a switch on the sidearm controller 29, or additional logic may be provided (FIG. 9) which requires that the fire control system is providing valid fire control commands.

Figure 5:
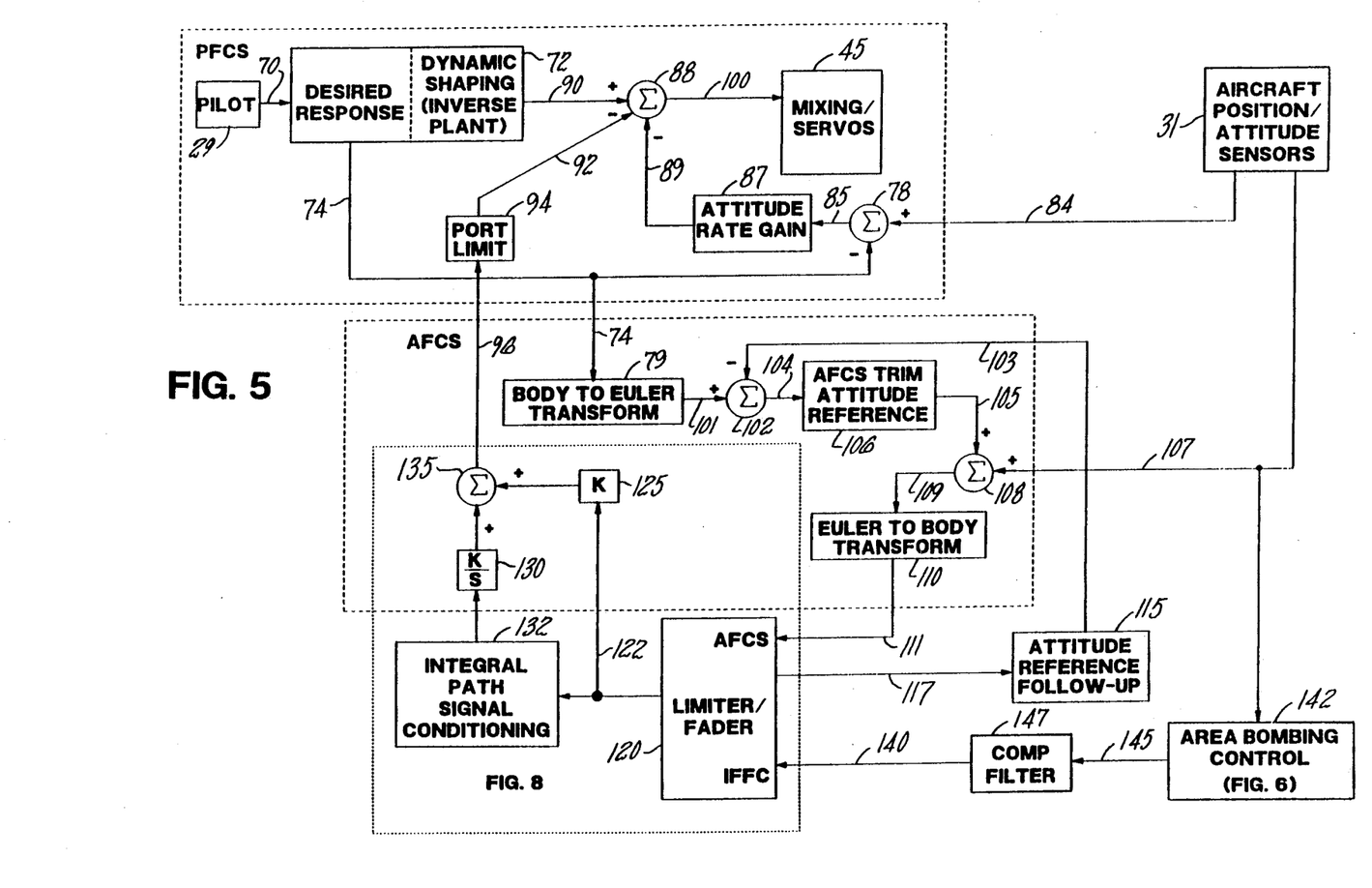
FIG. 5 is a simplified schematic block diagram of the integrated fire and flight control system of FIG. 4.

FIG. 5 illustrates the functional interconnection of the IFFC 25 with the PFCS 22 and the AFCS 24. FIG. 5 will be described with respect to the yaw axis modules 35, 39, 60, e.g., flight control yaw attitude reference and fire control azimuth coordinate error signals; however, it will be understood by those skilled in the art that the functional interconnection of FIG. 5 is equally applicable to flight control pitch attitude reference and fire control elevation coordinate error signals.

The PFCS receives a yaw axis command signal on line 70, provided through trunk lines 33 and lines 30, from the sidearm controller 29 (FIG. 4). In the present embodiment, the sidearm controller is a four-axis force stick in which yaw axis command signals are generated by the pilot's lateral twisting (left or right) of the sidearm controller, and in which pitch axis command signals are generated by the pilot's pushing and pulling (front or back) of the sidearm controller. The yaw command signal is presented to the input of signal shaping circuitry 72. The signal shaping circuitry comprises a desired rate response section that provides a commanded yaw rate signal on a line 74 indicative of the desired rate of change of the aircraft attitude about the yaw axis. Additionally, the signal shaping circuitry 72 comprises a dynamic shaping section which is an inverse model of the approximate plant yaw axis response that provides a control command signal on a line 90. The control command signal on the line 90 represents the approximate rotor command necessary to achieve the desired yaw-axis rate of change of the aircraft for each pilot commanded maneuver, and provides the primary control input to the rotor mixing function 45.

The commanded yaw rate signal on line 74 is presented simultaneously to a summing junction 78 in the PFCS, and a Body to Euler Transformation 79 in the AFCS. The summing junction 78 sums the commanded yaw rate signal on line 74 (from the signal shaping circuitry 72) with the aircraft's actual yaw rate, received (from sensors 31, through lines 32 and trunk 33) as a sensed yaw rate signal on line 84. The output of the summing junction 78 is a yaw rate error signal on a line 85. The rate error signal is amplified in a rate gain stage 87 and is provided on a line 89 to one input of a second PFCS summing junction 88. The summing junction 88 also receives the control command signal on line 90 from the signal shaping circuitry 72, and a yaw command modifying signal on a line 92 from a rate and magnitude limiter 94. The limiter 94, which receives a non-limited version of the yaw command modifying signal on a line 96 (through bus 43) from the AFCS, limits the yaw command modifying signal if its magnitude and rate of change limits are exceeded. The output of the summing junction 88 is provided on a line 100, and presented through the PFCS output trunk lines 44 to the mixing function 45.

The magnitude and rate of change of the yaw command modifying signal from the AFCS is a function of the aircraft heading error during normal operations. The yaw command modifying signal provides an aircraft attitude feedback loop around the rotor command signal. The attitude feedback loop is the second of two feedback loops around the rotor command signal; the first being a yaw rate feedback loop provided by the yaw rate error signal on line 89.

The yaw command modifying signal is a calculated value provided by a model following algorithm within the AFCS, based on the actual aircraft response to the rotor command signal. The yaw command modifying signal modifies the rotor command signal to achieve the pilot commanded yaw attitude. A more detailed description of the model following algorithms of the AFCS, and AFCS architecture, is given in commonly owned copending U.S. patent application No. 07/751,431, entitled "High Speed Turn Coordination For A Rotary Wing Aircraft", the disclosure of which is incorporated herein by reference.

A yaw attitude feedback error signal is normally used to provide the yaw command modifying signal. However, during operation of the IFFC in the coordinated area bombing mode, a fire control system azimuth coordinate error signal is used to provide the yaw command modifying signal. The attitude feedback error signal is developed in the AFCS. The commanded yaw rate signal is provided on the line 74 to the Body to Euler Transformation 79. The Transformation 79 transforms the yaw rate signal, which is in terms of aircraft body axes, to an inertial axes reference on a line 101, which is provided to a summing junction 102. The other input to the summing junction 102 is an attitude reference follow-up error signal on a line 103.

The output of the summing junction 102 is provided on a line 104 to an AFCS trim attitude reference function 106. The reference function 106 is an integral function which converts the commanded yaw rate signal (in terms of inertial axes on the line 101) to a commanded yaw attitude signal on a line 105. The commanded yaw attitude signal is provided to a summing junction 108, the other input of which is a yaw attitude signal on a line 107, provided from sensors 31, through lines 32 and trunk 34 (FIG. 4). The output of the summing junction 108 is the yaw attitude feedback error signal on a line 109 in terms of inertial axes, and is the difference between the commanded yaw attitude on the line 105 and the actual aircraft yaw attitude on the line 107. The yaw attitude feedback error signal is provided to a Euler to Body Transform 110 which transforms the yaw attitude feedback error signal from an inertial axes reference back to an aircraft body axes reference on a line 111. The operation of both Transform functions 79, 110 are described in greater detail in the aforementioned commonly owned copending U.S. patent application No. 07/751,431, the disclosure of which is incorporated herein by reference.

During operation of the system in the coordinated area bombing mode, the yaw attitude feedback error signal is replaced by a fire control azimuth coordinate error signal. Therefore, there will be a difference between the yaw attitude reference as indicated by the AFCS and the actual aircraft yaw attitude because the yaw attitude feedback error signal was not used to provide the yaw command modifying signal. Therefore, the attitude reference follow-up error signal is provided on the line 103 to the summing junction 102 to modify the rate signal on the line 104. The attitude rate follow-up error signal is provided by an attitude follow-up portion 115 of the IFFC. The attitude follow-up portion receives an attitude follow-up error signal on a line 117, and converts it to an attitude reference follow-up error signal.

The yaw attitude feedback error signal on the line 111 is applied to a limiter/fader portion 120 of the IFFC. During normal operations, the limiter/fader portion 120 passes the yaw attitude feedback error signal to the line 122, where the yaw attitude feedback error signal is applied via a proportional path containing a gain function 125 to a summing junction 135. The yaw attitude feedback signal is also applied to the summing junction 135 via an integral path containing a signal selection/conditioning function 132 and an integral function 130. During normal operations, the signal selection/conditioning function 132 simply provides the yaw attitude feedback error signal to the integral function 130. The output of the summing junction 135 is the yaw command modifying signal on the line 96.

During operation of the system in the coordinated area bombing mode, the limiter/fader portion 120 of the IFFC replaces the yaw attitude feedback error signal on the line 122 with an IFFC azimuth coordinate error signal on a line 140. Additionally, the signal selection/conditioning function 132 modifies the IFFC azimuth coordinate error signal when the coupled aiming mode is enabled as described in greater detail hereinafter with respect to FIG. 8.

The IFFC azimuth coordinate error signal is provided by the aircraft fire control system. As described in greater detail hereinafter with respect to FIG. 6, the area bombing control function 142 provides azimuth and elevation coordinate error signals corresponding to targeting coordinates within a target area. The target area is selected by the pilot. Once the aircraft attitude reaches a firing attitude corresponding to the attitude required for the delivery of ordinance at one of the target coordinates within the target area, the bombing control function fires a corresponding weapon.

The azimuth and elevation coordinate error signals are applied on a line 145 to a complementary filter function 147. The complementary filter may be of any suitable type known in the art for allowing aircraft body rate frequency band width to remain high while lowering aircraft body rate response to noise from the fire control path. The output of the complementary filter 147 is provided on the line 140 to the limiter/fader 120.

It will therefore be understood by those skilled in the art that the IFFC coordinated area bombing function uses the AFCS attitude hold signal path, which is normally provided with a yaw attitude feedback error signal. The normal attitude hold function is engaged prior to initiation of IFFC coordinated area bombing. After initiation of IFFC coordinated area bombing, the normal attitude feedback path for the yaw axis is modified by replacing the yaw attitude feedback error signal with the IFFC azimuth coordinate error signal. Since the fire control azimuth coordinate error signal is essentially the same signal that would otherwise be commanding the pointing direction of a rocket launcher, the fire control solution is satisfied when the coordinate error signal is zero, i.e., the rocket launcher is exactly aligned with the proper firing attitude. This assumes that the target line of sight is combined with the proper bore sight correction, target and ownship states by the fire control function.

The area bombing control portion of the fire control system provides pairs of azimuth and elevation coordinate error signals as the aircraft attitude reference during operation in the programmed area bombing mode, replacing the yaw and pitch attitude feedback error signals, respectively. When the magnitude of both coordinate error signals are below respective threshold levels, the aircraft is in the proper firing attitude, and a fire command is issued. Once a weapon is fired, the next pair of coordinate error signals provide the aircraft attitude reference. This procedure is repeated until all the designated target coordinates within the target area are fired upon.

Figure 6:
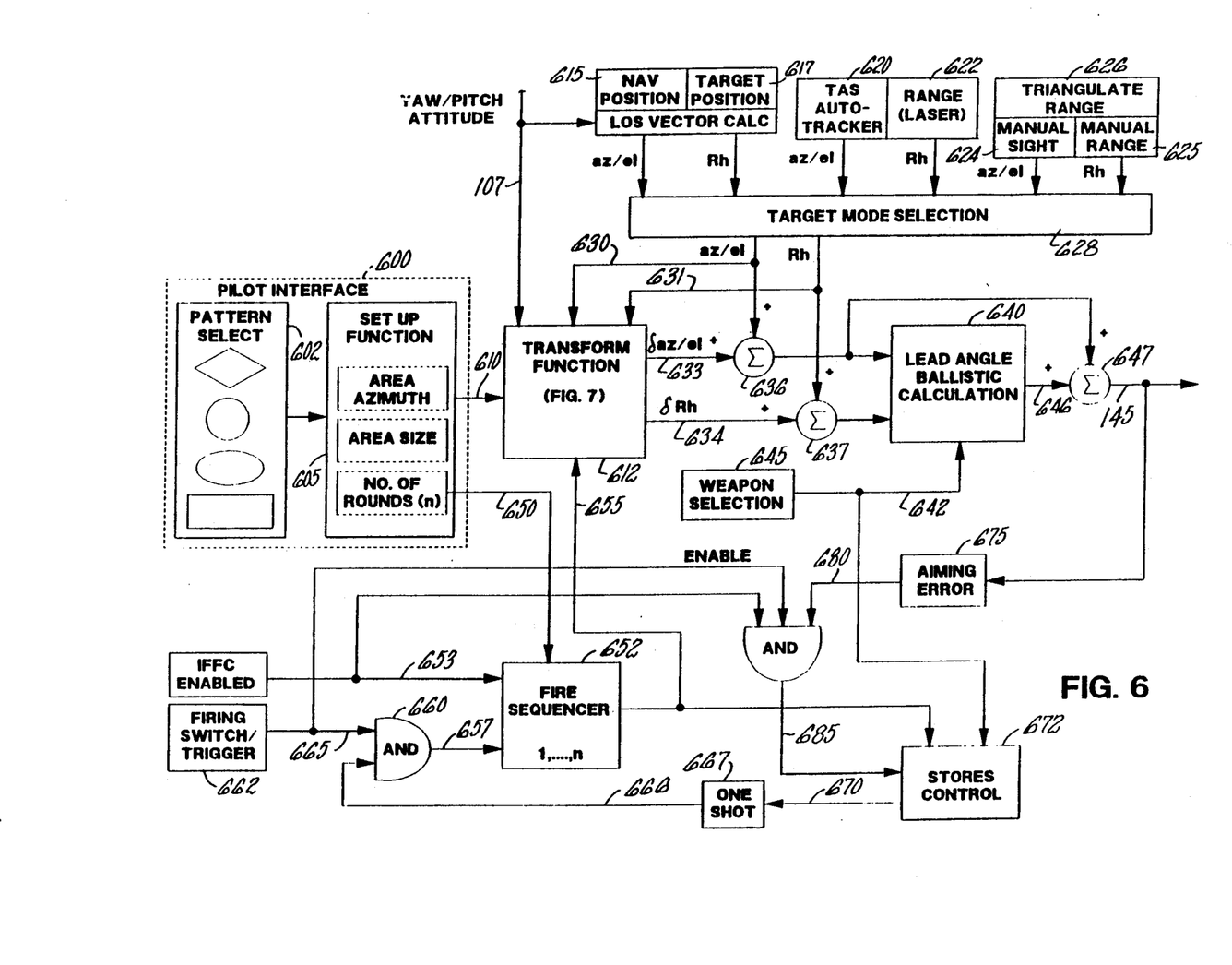
FIG. 6 is a schematic block diagram of a coordinated area bombing control portion of the integrated fire and flight control system of FIG. 5.

Referring to FIG. 6, the area bombing control portion 161 of the fire control system is shown in greater detail. A pilot interface 600 allows the pilot to control the shape, orientation and size of the target area and the number of ordinance to be delivered in the target area. The system then automatically determines the spread of ordinance within the target area. A pattern selection function 602 is used to select the shape of the target area. The invention is illustrated in FIG. 6 as having four possible target area shapes: a diamond, circle, ellipse and rectangle; however, any shape may be used as desired for the target area.

A set up function 605 is used to select the target area orientation and size, and the number of rounds. The area orientation is determined by selecting the orientation of the area azimuth (major axis) with respect to the aircraft. The area size may be determined in one of two ways: (1) providing a specific area size, e.g., square feet or square meters, or (2) selecting the dimensions of the pattern, i.e., length and width for the diamond and rectangle, radius for the circle, and major and minor axes for the ellipse.

The pilot then selects the number of rounds to be fired into the target area. The set up function then determines the coordinates within the target area for targeting each round. The coordinates may be determined using a lookup table or other calculation function. In the simplest embodiment of the invention, the coordinates are determined by dividing the target area into equal components corresponding to the number of rounds, and then selecting the target coordinate as the center of each equal component. The coordinates are determined with respect to a reference point in each pattern. The invention will be described with the reference point in the center of the target area; however, it will be understood by those skilled in the art that the invention will work equally as well with any suitable reference point bearing a known relationship with respect to the target area.

The target coordinates within the target area are provided on a line 610 to a transform function 612. In the transform function, the target coordinates are transformed into line of sight (LOS) vectors, i.e., LOS angles and ranges from the aircraft to the target. A LOS vector is defined herein as a vector between the target coordinates and an arbitrary point on the aircraft body used for line of sight calculations, e.g., an aircraft reference axis. The line of sight vector is resolved into an elevation component and an azimuth component.

The transform function 612 is responsive to the aircraft yaw and pitch attitude on the line 107. Additionally, the transform function is responsive to fire control target position inputs. The target position inputs provide targeting azimuth and elevation information about the area to be bombed. For example, the target position data inputs may provide targeting information relative to the center of the area or a specific point on the periphery of the area. The azimuth and elevation information provided by the target position data inputs is a line of sight vector. The targeting information may be provided by target coordinates transmitted to the aircraft by ground forces, or other map information. The aircraft map position and altitude 615 and target map position 617 are provided to a calculation function 619 which determines the LOS vector (az,el,Rh) between the aircraft and the target, where az is the azimuth angle of the LOS vector with respect to the aircraft reference axis and el is the elevation angle of the LOS vector with respect to the aircraft reference axis. Similarly, on board sensors including a TAS auto-tracker 620 and laser rangers 622 may be used to provide the LOS vector. The LOS vector may also be provided by the pilot visually sighting a target 624, and a manual dial in range 625 or a triangulation range 626 using information provided by the pilot's "smart" helmet. The pilot selects the source of the targeting information using a target mode selection function 628. The target LOS vector is provided on the lines 630 and 631 to the transform function 612.

Figures 7A, 7B:
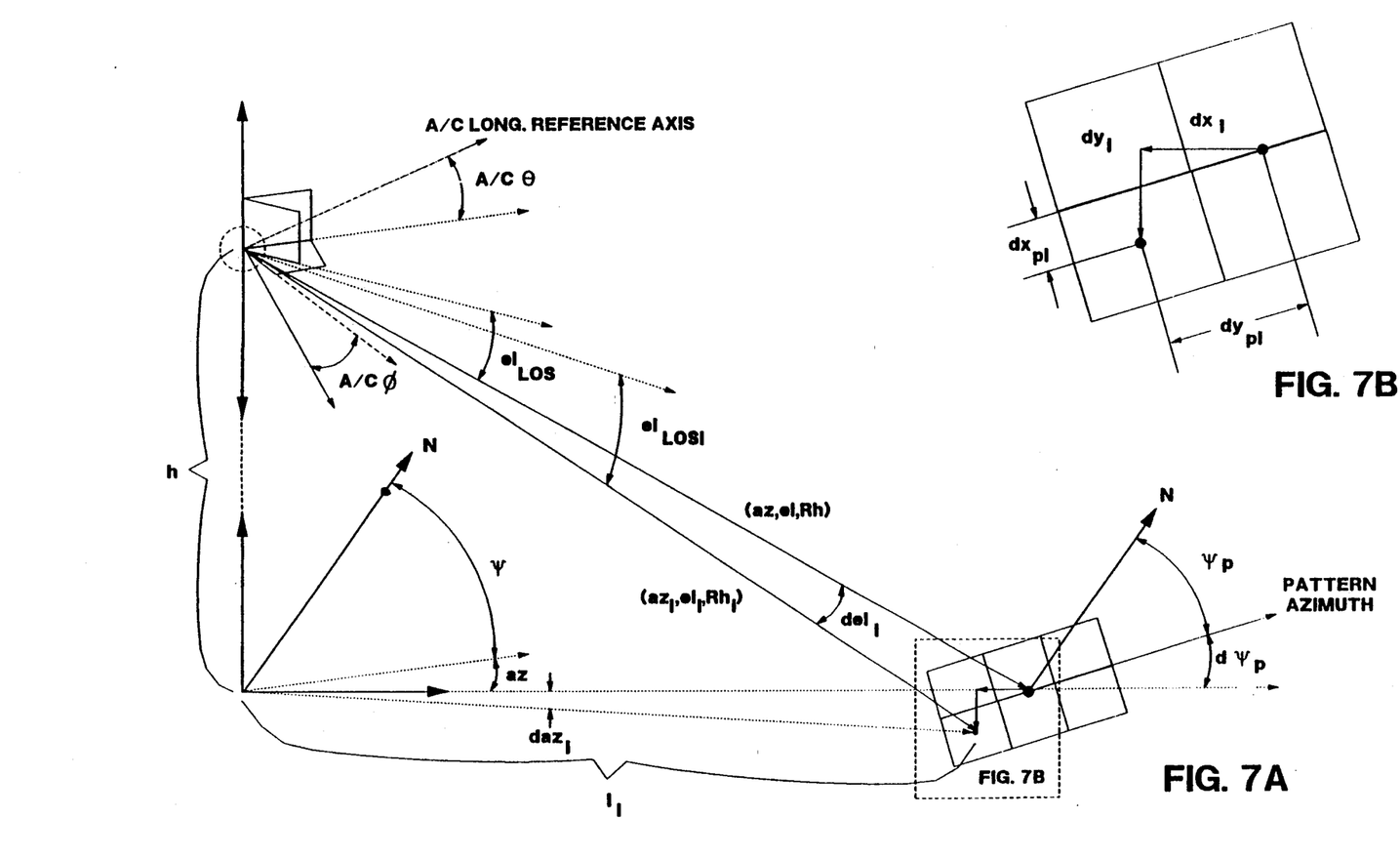
FIGS. 7A and 7B are diagrams showing the transformation of area bombing coordinates to corresponding aircraft attitude signals in a transform function of FIG. 6.

The operation of the transform function 612 is illustrated in FIGS. 7A and 7B. Referring to FIGS. 7A and 7B, the setup function provides the transform function with pairs of coordinates ($\delta x_{pi}$, $\delta y_{pi}$) with respect to the target area reference points (P). The pairs of coordinates represent the individual targeted coordinates within the target area. The target coordinates ($\delta x_{pi}$, $\delta y_{pi}$) are given in a frame of reference with respect to the pattern azimuth ($\Psi_p$).

The transform function first converts the pairs of target coordinates from a pattern azimuth frame of reference to the LOS vector azimuth frame of reference ($\delta x_i$, $\delta y_i$). The pattern azimuth ($\Psi_p$) and an aircraft azimuth ($\Psi$) are measured with respect to a reference axis, e.g., North (N). The coordinate transform is performed using equations 1 and 2 below:

$$\delta x_i = \delta x_{pi} * \cos(\delta \Psi_p) - \delta y_{pi} * \sin(\delta \Psi_p) \qquad \text{(eq. 1)}$$

$$\delta y_i = \delta y_{pi} * \cos(\delta \Psi_p) + \delta x_{pi} * \sin(\delta \Psi_p) \qquad \text{(eq. 2)}$$

where ST is given by equation 3 below:

$$\delta \Psi_p = \Psi_p - (\Psi + az) \qquad \text{(eq. 3)}$$

Next, the transform function determines the change in the LOS vector ($\delta az_i$, $\delta el_i$, $\delta Rh_i$) between the reference point and the target coordinates. The el and the az angles provided by the target mode selection 628 (FIG. 6) are referenced to the aircraft body; however, the $az_{LOS}$ and $el_{LOS}$ of the LOS vector measured with respect to the earth's horizontal plane are used to derive the change in the LOS vector between the reference point and the target coordinates. The elevation component of the line of sight vector with respect to the earth's horizontal plane is given in equation 4 below:

$$el_{LOS} = el + el_{A/C} \qquad \text{(eq. 4)}$$

where $el_{LOS}$ is the elevation angle of the LOS vector with respect to the horizontal plane, and $el_{A/C}$ is the elevation angle contribution of the aircraft reference axis pitch and roll attitude ($\Theta, \phi$) with respect to the horizontal plane. An approximation for determining $el_{A/C}$ is given by equation 5 below:

$$el_{A/C} \approx -\Theta * \sin(az) + \phi * \cos(az) \qquad \text{(eq. 5)}$$

where $\Theta$ is the aircraft pitch attitude with respect to horizontal and $\phi$ is the aircraft roll attitude with respect to horizontal. In equation 5, the aircraft azimuth (az) is used to approximate $az_{LOS}$ for small aircraft attitudes.

The incremental change in the LOS vector elevation component ($\delta el_i$) for the $i^{th}$ target location is given by equations 6, 7, 8 and 9 below:

$$h = -Rh * \sin(el_{LOS}) \qquad \text{(eq. 6)}$$

$$l_i = Rh * \cos(el_{LOS}) + \delta x_i \qquad \text{(eq. 7)}$$

$$el_i = -\arctan(h/l_i) \qquad \text{(eq. 8)}$$

$$\delta el_i = el_{LOSi} - el_{LOS} \qquad \text{(eq. 9)}$$

where h is the aircraft altitude.

The incremental-change in the LOS vector azimuth component ($\delta az_i$) for the $i^{th}$ target location is given by equation 10 below:

$$\delta az_i = \arctan(\delta y_i / l_i) \qquad \text{(eq. 10)}$$

Finally, the incremental change in the LOS range ($\delta Rh_i$) for the $i^{th}$ target location is given by equations 11 and 12 below:

$$R_i = \arcsin(h/l_i) \qquad \text{(eq. 11)}$$

$$\delta Rh_i = R_i - R \qquad \text{(eq. 12)}$$

As described hereinabove with respect to FIG. 7, the output of the transform function 612 is the incremental change in the target LOS vector ($\delta az_i$, $\delta el_i$, $\delta Rh_i$) corresponding to the first designated target coordinates within the target area. The output of the transform function 612 is provided on lines 633 and 634 to summing junctions 636 and 637, respectively. The other inputs to the summing junctions are the components of the targeting LOS vectors on lines 630 and 631. The output of the summing junctions 634 and 635 represent the LOS vector corresponding to the first designated target coordinates within the target area ($az_i$, $el_i$, $Rh_i$), and is provided to a lead angle ballistic calculation function 640. The calculation function 640 is also responsive to a signal on a line 642 from a weapons selection function 645, the signal being indicative of the type of weapon selected. The calculation function 640 modifies the targeting line of sight vector components for bore sight correction and weapons trajectory. The bore sight correction is indicative of the offset between the selected weapon and the aircraft reference axis. The weapons trajectory is indicative of the weapon launch angle required for the weapon to travel the distance between the aircraft and the target location.

The output of the calculation function 640 is provided on a line 646 to a summing junction 647. The other input to the summing junction 647 is the azimuth component of the aiming LOS vector. The output of the summing junction 647 is the azimuth coordinate error signal on the line 145. The azimuth coordinate error signal represents the amount of change in the aircraft yaw attitude for the aircraft to assume an aiming attitude. The aiming attitude is the aircraft attitude required during a weapons launch to deliver the selected weapon at the corresponding target coordinates within the target area. As will be described hereinafter with respect to FIG. 8, the IFFC attempts to drive the azimuth coordinate error signal to zero during operation in the programmed area bombing mode.

During operation in the coordinated area bombing mode, the area bombing control 142 also controls the firing of weapons. A weapon fire command is issued after the aircraft assumes the proper firing attitude. Once the pilot selects the number and type of weapons to be fired, the set up function 605 provides a signal on a line 650 indicative of the number of rounds (n) to a fire sequencer 652. The fire sequencer controls which weapons in the sequence of weapons, i.e., 1, 2, ..., n, is currently selected for firing. The fire sequencer 652 is also responsive to an IFFC enable signal on a line 653 indicative of the coordinated area bombing mode being enabled. The IFFC enable signal acts as a reset signal to the fire sequencer 652. The IFFC enable signal is provided in response to activation of the IFFC coordinated area bombing mode, i.e., the pilot depresses a switch on a control stick grip or side are controller, or repositions a switch on a fire control panel. Additional control logic may be used to provide the IFFC enable signal as described hereinafter with respect to FIG. 9. When the enable signal is not present on the line 653, the fire sequencer provides no output signal on a line 655, so that no weapon is selected for the coordinated area bombing mode. However, when the enable signal is present on the line 653, the fire sequencer initially selects the first weapon in the series of weapons, and once a weapon is fired, the fire sequencer selects the next weapon. If the enable signal is removed during a firing sequence, the fire sequencer is reset to zero and no further weapons are fired.

The fire sequencer 652 is also responsive to an increment signal on a line 657 provided by an AND gate 660 for selecting the next weapon in the sequence of weapons. The AND gate provides an increment signal on the line 657 when two conditions are met: the pilot is depressing a firing switch 662 (as indicated by a signal on a line 665), and a weapons is fired (as indicated by a signal on a line 666 from a one-shot 667). The one-shot 667 provides a momentary signal on the line 666 in response to a signal on a line 670 from the weapons stores control 672 indicating that a weapon was fired.

Three conditions must be met for the stores control 672 to automatically fire a weapon in the coordinated area bombing mode. First, the IFFC enable signal must be present on the line 653. Additionally, the firing switch/trigger must be engaged by the pilot. Finally, the azimuth and elevation coordinate error signals must be below corresponding threshold magnitudes. The azimuth and elevation coordinate error signals are provided on the line 145 to an aiming error function 675 which compares the coordinate error signals to respective threshold magnitudes. The threshold magnitudes are selected to be low enough to ensure that the ordinance are accurately delivered at the target locations. When both the azimuth and elevation coordinate error signals are below their respective threshold magnitudes, the aiming error function 675 provides a firing signal on line 680.

All three conditions required for automatic weapons firing in the coordinated area bombing mode are checked by AND gate 682. Once all three conditions checked by AND 682 are met, as indicated by a signal being present on lines 653, 665 and 680, AND gate 682 provides a fire command signal on line 685 to the stores control 672 to fire the current weapon in the sequence. When the weapon is fired, the fire sequencer is incremented, and provides a signal on line 655 for selecting the next weapon in the sequence for firing. It will be noted that the output of the fire sequencer 652 is also provided to the transform function 612 so that the azimuth and elevation commands corresponding to the next target coordinates ($\delta x_{pi+1}$, $\delta y_{pi+1}$) are used to develop the azimuth and elevation coordinate error signals.

Figures 8, 9:
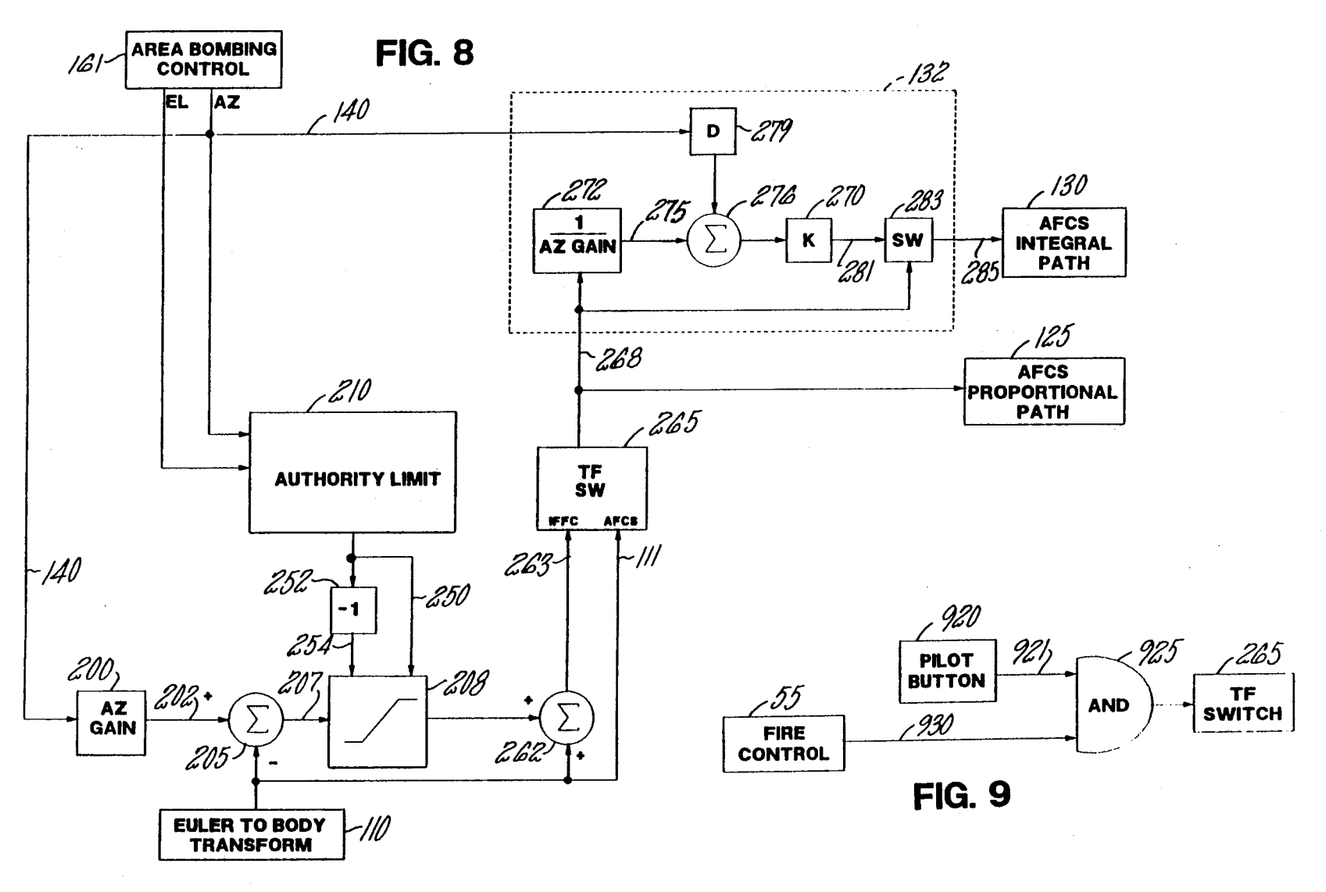
FIG. 8 is a schematic block diagram of an enable portion of the integrated fire and flight control system of FIG. 5.
FIG. 9 is a schematic block diagram of control logic for controlling the operation of a yaw and pitch transient free switch.

Referring now to FIG. 8, the function of the limiter/fader portion 120 of the IFFC is to fade-in the fire control azimuth and elevation coordinate error signals in place of the yaw and pitch attitude feedback error signals when IFFC coordinated area bombing is enabled. FIG. 8 will also be described with respect to yaw and azimuth signals; however, it is equally applicable to pitch and elevation signals as will be obvious to those skilled in the art. As described hereinbefore with respect to FIG. 5, a fire control azimuth coordinate error signal is provided on a line 140 from the area bombing control 142. The azimuth coordinate error signal is applied to a gain function 200, the output of which is provided on a line 202 to a summing junction 205. The gain function 200 is used to set the IFFC response for small errors without affecting the normal AFCS attitude gain value. It may be desirable to provide the IFFC with a larger gain for small errors to make the aircraft attitude more responsive to fire control azimuth commands, so that the aircraft rapidly assumes and maintains the correct firing attitude.

The other input to the summing junction 205 is the yaw attitude feedback error signal on the line 111, from the output of the Euler to Body Transform 110 (FIG. 5). The output of the summing junction 205 is an IFFC attitude error signal on a line 207, which is applied to A limiter function 208. The magnitude of the IFFC attitude error signal is the size of the change in attitude commanded by the azimuth coordinate error signal from the pilot's commanded yaw attitude. The upper and lower limits of the limit function 208 are determined in an authority limit portion 210 of the IFFC. The authority limit portion 210 is responsive to the fire control azimuth and elevation commands. The output of the authority limit portion 210 is provided on a line 250 to the limiter function 208 to determine the limiter function upper limit, and is provided to a multiplier 252 having a value of negative one, the output of which is the limiter function 208 lower limit on a line 254.

It will be noted that for larger azimuth commands on the line 140, the value of the gain 200 will change the value of the fire control azimuth command on the line 140 at which the limiter function 208 acts. For example, if the limiter upper limit is 6° and the gain function has a value of 2, the limiter function upper limit is 3° with respect to the fire control azimuth command. However, the limiter still acts at 6° with respect to the change in attitude indicated by the attitude feedback error signal on the line 111.

The IFFC attitude error signal is provided on the line 207 to the limiter function 208 to thereby limit its magnitude. The output of the limiter function 208 is provided on a line 260 to a summing junction 262. The other input to the summing junction 262 is the yaw attitude feedback error signal on the line 111.

The output of the summing junction 262 is an IFFC azimuth coordinate error signal on a line 263, the magnitude of which is limited with respect to the change it can command from the pilot's commanded attitude. If the difference between the IFFC azimuth coordinate error signal and the AFCS attitude feedback error signal is large, the limiter function 208 limits the magnitude of that difference to limit the effect of the IFFC attitude coordinate error signal on the aircraft attitude.

The magnitude limited IFFC azimuth coordinate error signal on the line 263, and the AFCS attitude feedback error signal on the line 111, are applied to a transient free switch 265. The transient free switch 265 is controlled by a pilot engagable switch, located for example on the sidearm controller 29 (FIG. 4). The output of the transient free switch is the AFCS attitude feedback error signal when the pilot is not depressing the sidearm controller switch, and the output of which is the IFFC magnitude limited azimuth coordinate error signal when the pilot is engaging the sidearm controller switch. Therefore, the IFFC coordinated area bombing mode will only be enabled when the pilot is manually engaging the transient free switch 265. If at any time during operation in the coordinated area bombing mode the pilot releases the switch, the system will return to normal operation.

The output of the transient free switch is provided on a line 268 to the gain function 125 in the AFCS proportional path (FIG. 5). The output of the transient free switch 265 is also provided on the line 268 to the integrator 130 in the AFCS integral path via the signal selection/conditioning function 132.

It is desirable to provide a high gain in the integral path during operation in the coordinated area bombing mode so that the attitude of the aircraft will rapidly assume the targeting solution. The increased integral gain is provided in a gain function block 270. The IFFC azimuth coordinate error signal is provided to the integral path via gain function 272 which divides the signal by the proportional path azimuth gain. Therefore, the value of the signal is returned to a unity scale of fire control angle error for ease of understanding the operation of the integral path function. The output of the gain function 272 is provided on a line 275 to a summing junction 276. The other input to the summing junction 276 is the azimuth coordinate error signal rate on a line 278 provided as the output of a differentiating function 279 which differentiates the azimuth coordinate error signal on the line 140. The azimuth coordinate error signal rate is provided to the summing junction 276 as an error damping signal to damp out over controlled integrator response caused by using the large gain in gain function 270.

The output of the gain function 270 is provided on a line 281 to a switch 283. The other input to the switch 283 is the output of the transient free switch 265 on the line 268. The switch 283 is responsive to the activation of the transient free switch. During normal operations, the switch provides the attitude feedback error signal on the line 268 directly to the AFCS integral path on line 285. During operations in the coordinated area bombing mode, the switch provides the IFFC azimuth coordinate error signal on the line 281 to the AFCS integral path on line 285.

The transient free switch 120 (FIG. 8) is described as being activated in response to the pilot depressing a switch or button on the sidearm controller 29 (FIG. 4). However, it may be desirable to prohibit operation in the coordinated area bombing mode unless certain other requirements are met. An example of a more complex control for the transient free switch 120 is shown in FIG. 9. When the button 920 on the pilot's sidearm controller is depressed, a signal is provided on a line 921 to AND gate 925. The other input to the AND gate 925 is a valid fire control signal on a line 930. The valid fire control signal is indicative of the fire control system being activated and a weapon being selected of the type having coordinated area bombing control. Additionally, the valid fire control signal is only provided if the aircraft attitude is within the selected weapons constraint limits, i.e., the aircraft yaw and pitch attitude are such that the weapon can be fired. If both conditions checked by AND gate 925 are met, i.e., the pilot depresses the button 920 and the valid fire control signal is present, then the AND gate 925 provides a signal on a line 932 to activate the transient free switch 120.

The invention is described as controlling both yaw and pitch during operation in the coordinated area bombing mode. However, the invention will work equally as well in an aircraft having rockets articulated in elevation and not in azimuth. In such a case, the elevation coordinate error signal is used to control the elevation of the turreted rocket, and the integrated fire and flight control system is only used to control aircraft azimuth when operating in the coordinated area bombing mode. Similarly, if the aircraft is provided with rockets articulated in azimuth and not in elevation, the fire control command is used to control the rocket azimuth, and the integrated fire and flight system controls only aircraft pitch using the fire control elevation coordinate error signal during operation in the coordinated area bombing mode. In either case, the principles of the present invention can be used to control aircraft yaw attitude and pitch attitude as required for targeting.

The invention is described as being performed in a flight control system in which calculations are determined digitally, as for example in a digital automatic flight control employing a known microprocessor for performing the algorithmic subroutines of the invention. However, the invention may also be accomplished by dedicated digital hardware or by analog hardware if desired. In such case, it may be implemented in a different fashion from that disclosed herein in accordance with the general equivalence between software and dedicated digital hardware and software, all as is well-known to those skilled in the art. Additionally, any cycle times, gains, counts, and the like contained herein may of course be adjusted to suit any implementation and utilization of the invention.

Although the invention has been shown and described with respect to exemplary embodiments thereof, it should be understood by those skilled in the art that the foregoing and other changes, omissions and additions may be made therein and thereto without departing from the spirit and scope of the present invention.

We claim:

1. An aircraft flight control system for providing control surface command signals to the aircraft control surfaces thereby controlling the yaw, pitch, roll and lift attitude axes of the aircraft in flight, comprising:

fire control means for providing at least one pair of azimuth and elevation coordinate error signals, said pairs of azimuth and elevation coordinate error signals each being indicative of the change in aircraft yaw attitude and pitch attitude for an aircraft to be aligned with an aiming attitude;

means for providing a coordinated area bombing signal in response to activation of a flight control system coordinated area bombing mode; and     one of said pairs of azimuth and elevation coordinate error signals providing the aircraft yaw attitude reference and pitch attitude reference in response to said coordinated area bombing signal.

2. An aircraft flight control system according to claim 1 further comprising:

means for providing a firing signal in response to both said azimuth and elevation coordinate error signals in said one of said pairs of azimuth and elevation coordinate error signals being below respective threshold magnitudes; and     weapons control means responsive to said firing signal for firing a weapon.

3. An aircraft flight control system according to claim 2 further comprising means responsive to said firing signal for selecting the next pair of azimuth and elevation coordinate error signals as the aircraft yaw and pitch attitude reference.

4. An aircraft flight control system according to claim 1 further comprising:
   means for providing a pattern shape signal indicative of the shape of a target area;
   means for providing a pattern azimuth signal indicative of the orientation of said target area;
   means for providing a pattern size signal indicative of the size of said target area;
   means for providing a weapons signal indicative of the number of weapon rounds to be fired into said target area; and
   means responsive to said pattern shape signal, said pattern azimuth signal, said pattern size signal and said weapons signal for providing target coordinate signals each being indicative of a target location within said target area corresponding to each of said weapon rounds, each of said target locations being determined with respect to a target area reference point.

5. An aircraft flight control system according to claim 4 further comprising:
   target tracking means for providing a target azimuth signal and a target elevation signal indicative of the azimuth and elevation of said target area reference point with respect to an aircraft reference axis;
   means for providing a range signal indicative of the range from said aircraft to said target area reference point;
   means for providing a yaw attitude signal indicative of the aircraft yaw attitude;
   means for providing a pitch attitude signal indicative of the aircraft pitch attitude; and
   signal processing means responsive to said target azimuth signal, said target elevation signal, said range signal, said target coordinate signals, said yaw attitude signal and said pitch attitude signal for providing said pairs of elevation and azimuth coordinate error signals, each pair of said elevation and azimuth coordinate error signals corresponding to one of said target locations within said target area.

6. An aircraft flight control system according to claim 4 further comprising a pilot interface operable by a pilot for providing said pattern shape signal, said pattern azimuth signal, said pattern size signal and said weapons signal.

7. An aircraft flight control system according to claim 5 further comprising:
   weapon indicating means for providing a weapon indication signal indicative of the type of weapons selected for firing at said target locations;
   means responsive to said weapon indicating signal for providing bore sight correction signals each indicative of the bore sight offset between one of said selected weapons and said aircraft reference axis;
   means responsive to said weapon indicating signal, said target azimuth signal, said target elevation signal and said range signal for providing weapon trajectory signals each indicative of the change in aircraft attitude required for a weapon to strike a corresponding target location due to weapon trajectory; and
   said signal processing means being further responsive to said bore sight correction signals and said weapon trajectory signals for providing said pairs of azimuth and elevation coordinate error signals.

8. An aircraft flight control system according to claim 1 further comprising switch means operable by a pilot, said means for providing a coordinated area bombing signal being responsive to the continuous activation of said switch means for providing said programmed area bombing signal, said means for providing a coordinated area bombing signal being responsive to the deactivation of said switch means for removing said coordinated area bombing signal.

9. A helicopter integrated fire and flight control system for providing control surface command signals to the helicopter control surfaces thereby controlling the yaw, pitch, roll and lift attitude axes of the helicopter in flight, comprising:
   fire control means for providing at least one pair of azimuth and elevation coordinate error signals, said pairs of azimuth and elevation coordinate error signals each being indicative of the change in aircraft yaw attitude and pitch attitude for an aircraft to be aligned with an aiming attitude;
   means for providing a coordinated area bombing signal in response to activation of a flight control system coordinated area bombing mode;
   one of said pairs of azimuth and elevation coordinate error signals providing the aircraft yaw attitude reference and pitch attitude reference in response to said coordinated area bombing signal;
   means for providing a firing signal in response to both said azimuth and elevation coordinate error signals in said one of said pairs of azimuth and elevation coordinate error signals being below respective threshold magnitudes; and
   weapons control means responsive to said firing signal for firing a weapon.

10. A helicopter integrated fire and flight control system according to claim 9 further comprising means responsive to said firing signal for selecting the next pair of azimuth and elevation coordinate error signals as the aircraft yaw and pitch attitude reference.

11. A helicopter integrated fire and flight control system according to claim 10 further comprising:
   means for providing a pattern shape signal indicative of the shape of a target area;
   means for providing a pattern azimuth signal indicative of the orientation of said target area;
   means for providing a pattern size signal indicative of the size of said target area;
   means for providing a weapons signal indicative of the number of weapon rounds to be fired into said target area; and
   means responsive to said pattern shape signal, said pattern azimuth signal, said pattern size signal and said weapons signal for providing target coordinate signals each being indicative of a target location within said target area corresponding to each of said weapon rounds, each of said target location being determined with respect to a target area reference point.

12. A helicopter integrated fire and flight control system according to claim 11 further comprising:
   target tracking means for providing a target azimuth signal and a target elevation signal indicative of the azimuth and elevation of said target area reference point with respect to an aircraft reference axis;
   means for providing a range signal indicative of the range from said aircraft to said target area reference point;

means for providing a yaw attitude signal indicative of the aircraft yaw attitude;

means for providing a pitch attitude signal indicative of the aircraft pitch attitude; and signal processing means responsive to said target azimuth signal, said target elevation signal, said range signal, said target coordinate signals, said yaw attitude signal and said pitch attitude signal for providing said pairs of elevation and azimuth coordinate error signals, each pair of said elevation and azimuth coordinate error signals corresponding to one of said target locations within said target area.

13. A helicopter integrated fire and flight control system according to claim 12 further comprising a pilot interface operable by a pilot for providing said-pattern shape signal, said pattern azimuth signal, said pattern size signal and said weapons signal.

14. A helicopter integrated fire and flight control system according to claim 12 further comprising:

weapon indicating means for providing a weapon indication signal indicative of the type of weapons selected for firing at said target locations;

means responsive to said weapon indicating signal for providing bore sight correction signals each indicative of the bore sight offset between one of said selected weapons and said aircraft reference axis;

means responsive to said weapon indicating signal, said target azimuth signal, said target elevation signal and said range signal for providing weapon trajectory signals each indicative of the change in aircraft attitude required for a weapon to strike a corresponding target location due to weapon trajectory; and said signal processing means being further responsive to said bore sight correction signals and said weapon trajectory signals for providing said pairs of azimuth and elevation coordinate error signals.

15. A helicopter integrated fire and flight control system according to claim 9 further comprising switch means operable by a pilot, said means for providing a coordinated area bombing signal being responsive to the continuous activation of said switch means for providing said programmed area bombing signal, said means for providing a coordinated area bombing signal being responsive to the deactivation of said switch means for removing said coordinated area bombing signal.

* * * * *